United States Patent
Graeve et al.

(10) Patent No.: US 10,448,570 B2
(45) Date of Patent: Oct. 22, 2019

(54) SYSTEM OF LAYING SWATH OF CUT CROP FOR IMPROVED DRY DOWN TIME AND METHOD THEREOF

(71) Applicant: Deere & Company, Moline, IL (US)

(72) Inventors: Joshua D. Graeve, Ottumwa, IA (US); Roger D. Stephenson, Ottumwa, IA (US); Joshua Gnewuch, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 10 days.

(21) Appl. No.: 15/701,944

(22) Filed: Sep. 12, 2017

(65) Prior Publication Data

US 2018/0116116 A1    May 3, 2018

Related U.S. Application Data

(60) Provisional application No. 62/414,265, filed on Oct. 28, 2016.

(51) Int. Cl.
  *A01D 43/04* (2006.01)
  *A01D 43/10* (2006.01)
  (Continued)

(52) U.S. Cl.
  CPC ........... *A01D 43/04* (2013.01); *A01D 34/032* (2013.01); *A01D 43/10* (2013.01); *A01D 57/28* (2013.01); *A01D 78/14* (2013.01)

(58) Field of Classification Search
  CPC ........ A01D 43/04; A01D 43/10; A01D 57/28; A01D 34/667
  See application file for complete search history.

(56) References Cited

U.S. PATENT DOCUMENTS

| | | | |
|---|---|---|---|
| 4,807,429 A | | 2/1989 | Roberts |
| 4,922,664 A | * | 5/1990 | Spinks .............. B24C 5/04 239/63 |

(Continued)

FOREIGN PATENT DOCUMENTS

| | | |
|---|---|---|
| DE | 2753102 A1 | 7/1978 |
| EP | 2710875 A1 | 3/2014 |

(Continued)

OTHER PUBLICATIONS

European Search Report, dated Mar. 28, 2018, pp. 1-10.

*Primary Examiner* — Alicia Torres
(74) *Attorney, Agent, or Firm* — Taft Stettinius & Hollister LLP; Stephen F. Rost

(57) ABSTRACT

A tractor assembly includes a tractor having a first set of wheels and a second set of wheels, a mower-conditioner assembly coupled to the tractor, a shield coupled to the conditioner at a location rearward thereof, and a crop moving assembly coupled to either the tractor or mower-conditioner assembly. The mower-conditioner assembly includes a mowing mechanism configured to cut a crop and a conditioner configured to crimp the crop. The shield deflects the crimped crop rearwardly therefrom and forms a windrow of a first width. The windrow is disposed directly behind the tractor and includes a device for spreading the windrow in at least one direction to form a second width. The second width is greater than the first width.

14 Claims, 5 Drawing Sheets

(51) Int. Cl.
*A01D 57/28* (2006.01)
*A01D 34/03* (2006.01)
*A01D 78/14* (2006.01)

(56) References Cited

U.S. PATENT DOCUMENTS

| | | | |
|---|---|---|---|
| 5,930,988 A | 8/1999 | Hanson | |
| 6,415,590 B1 * | 7/2002 | Lohrentz | A01D 57/20 56/14.9 |
| 6,862,873 B2 * | 3/2005 | Franet | A01D 57/20 56/192 |
| 7,028,459 B2 * | 4/2006 | Lohrentz | A01D 57/20 56/192 |

FOREIGN PATENT DOCUMENTS

| | | | |
|---|---|---|---|
| FR | 1599812 A | 7/1970 | |
| FR | 2417249 A1 * | 9/1979 | A01D 57/30 |
| FR | 2741506 A1 * | 5/1997 | A01D 43/04 |
| NL | 1006277 C1 | 12/1998 | |

\* cited by examiner

SYSTEM OF LAYING SWATH OF CUT CROP FOR IMPROVED DRY DOWN TIME AND METHOD THEREOF

RELATED APPLICATIONS

This application claims priority to U.S. Patent Application Ser. No. 62/414,265, filed Oct. 28, 2016, the disclosure of which is incorporated by reference in its entirety herein.

FIELD OF THE DISCLOSURE

The present disclosure relates to depositing a swath of cut crop, and in particular, to a system and method of depositing a full width swath of cut crop without running over the swath with a tractor on a subsequent pass.

BACKGROUND OF THE DISCLOSURE

In the hay and forage industry, a cutting or mowing device is used to cut crop. Once the crop is mowed, the crop is allowed to dry before it is baled or otherwise collected. In this industry, it is desirable to reduce an amount of time it takes for hay or other crop to dry down, i.e., to dry or reduce moisture from the plant or crop. A faster dry down time can result in less time between cutting and baling the crop, which can minimize risk to the crop while sitting in the field.

One example of reducing dry down time is to spread the crop as wide as possible to maximize the exposure of the crop to the sun, wind, and surrounding environment. In doing so, moisture from the crop can evaporate quicker. A limitation to this approach, however, occurs when using a pull behind mowing assembly (e.g., a mower conditioner, a disc mower, etc.) to cut the crop. This is particularly true if the windrow or swath of cut crop is too wide such that during a subsequent pass a tractor wheel runs over a portion of the crop. If the crop is run over by the wheel, the crop can be packed down and thus its dry down time can be much longer.

SUMMARY

In one embodiment of the present disclosure, a tractor assembly includes a tractor including a first set of wheels and a second set of wheels; a mower-conditioner assembly coupled to the tractor, the mower-conditioner assembly including a mowing mechanism configured to cut a crop and a conditioner configured to crimp the crop; a shield coupled to the conditioner at a location rearward thereof, the shield configured to deflect the crimped crop rearwardly therefrom and form a windrow of a first width; and a crop moving assembly coupled to either the tractor or mower-conditioner assembly, the crop moving assembly being disposed directly behind the tractor; wherein, the crop moving assembly includes a device for spreading the windrow in at least one direction to form a second width; wherein, the second width is greater than the first width.

In one example of this embodiment, the first width is less than a first distance defined between the first set of wheels and a second distance defined between the second set of wheels. In a second example, the second width is equal to or greater than the first distance and second distance. Alternatively, the second width may be greater than either the first or second distance, but not both. In a third example, the mower-conditioner assembly is pivotably coupled to the tractor and disposed offset to one side thereof. In a fourth example, the crop moving assembly includes a powered brush. In another example, the crop moving assembly comprises a fan, a wheel rake, a basket rake, or a combination thereof. In a further example, the crop moving assembly operably moves the windrow in more than one direction.

In another embodiment of this disclosure, a tractor assembly includes a windrower including a first set of wheels and a second set of wheels, the first set of wheels spaced apart by a first distance and the second set of wheels spaced apart by a second distance; a cutter bar assembly coupled to at least a front end of the windrower, the cutter bar assembly including a cutting mechanism configured to cut a crop; a conditioner coupled to the tractor at a location behind the cutter bar assembly and forward of the first and second set of wheels, the conditioner configured to crimp or condition the crop; a shield coupled to the conditioner at a location rearward thereof, the shield configured to deflect the crimped or conditioned crop rearwardly therefrom and form a windrow having a first width; and a crop moving assembly coupled to the windrower at a location behind the windrower; wherein, the crop moving assembly includes a device for spreading the windrow in at least one direction to form a second width; wherein, the second width is greater than the first width.

In a first example of this embodiment, the first width is less than the first distance and the second distance. In a second example, the second width is equal to the greater of the first distance and second distance. Alternatively, the second width may be greater than both the first distance and second distance. In a third example, the crop moving assembly includes a powered brush. In a fourth example, the crop moving assembly includes a fan, a wheel rake, a basket rake, or a combination thereof. In another example, the crop moving assembly operably moves the windrow in more than one direction.

In a further example of the present disclosure, a tractor assembly includes a tractor including a first set of wheels and a second set of wheels, the first set of wheels spaced apart by a first distance and the second set of wheels spaced apart by a second distance; a disc mower assembly coupled to the tractor, the disc mower assembly including a cutting mechanism configured to cut a crop; a shield coupled to the disc mower at a location rearward thereof, the shield configured to deflect the crop rearwardly therefrom and form a windrow having a first width; and a crop moving assembly coupled to the tractor at a location rearward of the tractor; wherein, the crop moving assembly includes a device for spreading the windrow in one direction to form a second width; wherein, the second width is greater than the first width.

In one example of this embodiment, the first width is less than the first distance and the second distance. In a second example, the second width is equal to the greater of the first distance and second distance. Alternatively, the second width may be greater than both the first distance and second distance. In a further example, the crop moving assembly includes a powered brush. In yet a further example, the crop moving assembly includes a fan, a wheel rake, a basket rake, or a combination thereof.

In another embodiment of the present disclosure, a method of forming a swath of crop for improved dry down time includes providing a tractor including a first set of wheels and a second set of wheels, a mower-conditioner assembly coupled to the tractor, a shield coupled to the conditioner, and a crop moving assembly coupled to either the tractor or mower-conditioner assembly; operably pulling the mower-conditioner assembly and crop moving assembly in a forward direction of travel during a first pass to cut the crop; cutting the crop with a mowing mechanism of the mower-conditioner assembly; crimping or conditioning the crop with a conditioner of the mower-conditioner assembly; forming a narrow windrow of the crop with the shield, the narrow windrow having a first width; straddling the narrow windrow with the first and second set of wheels during a second pass; and spreading the windrow in at least one direction with the crop moving assembly after the straddling step.

In one example of this embodiment, the method may include spreading the windrow in the at least one direction so that the windrow includes a width that is greater than the first width.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
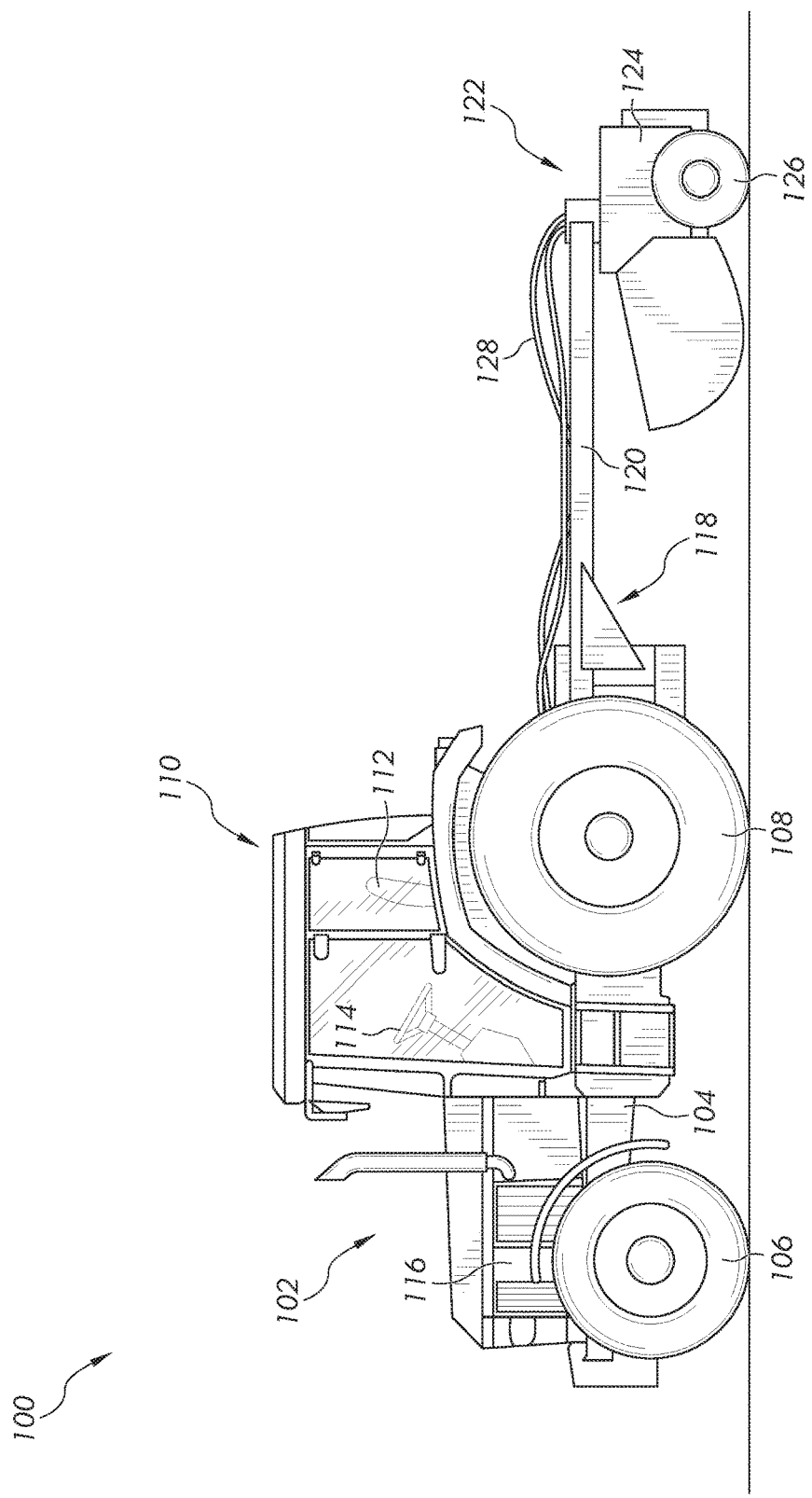
FIG. 1 is a side view of a combined tractor and mower-conditioner assembly.

Referring to FIG. 1, a combined tractor and mower assembly 100 is illustrated. A tractor 102 may be any conventional tractor that includes a frame or chassis 104, a front wheel 106 and a rear wheel 108. The tractor 102 may include a cab 110 in which an operator may be seated in an operator's seat 112. The operator may utilize a plurality of operator controls 114 for controlling the tractor 102. As shown, the controls 114 may include a steering wheel, a gear selector, a joystick, a switch, a button, a lever, or any combination thereof. The tractor 102 may further include a conventional drive system 116 such as an engine, prime mover, transmission, differential, etc. The drive system 116 may be mechanical, electrical, hydraulic, pneumatic, or any other type of drive system or combination thereof.

The tractor 102 may include a rear hitch assembly 118 to which a mower-conditioner assembly 122 may be coupled. A tongue 120 or other similar device may couple the mower-conditioner assembly 122 to the tractor 102, as shown in FIG. 1. In this manner, the tractor 102 pulls the mower-conditioner assembly 122 in a forward or drive direction. The mower-conditioner 122 may include a mower or cutting mechanism such as a cutter bar, disc blades, or the like. The mowing mechanism may include a conventional disc-type cutter bar with rotating knives for cutting crop. In addition, the assembly 122 may include a wheel 126 that travels along a ground surface as the assembly 122 is pulled by the tractor 102. Fluid lines 128 may also be provided for driving the mower-conditioner assembly 122.

The mower-conditioner assembly 122 may also include a conditioner assembly 124 located behind or rearward of the mowing mechanism. The conditioner assembly 124 may be any conventional conditioner assembly such as a roll or impeller. Additional detail about the type of conditioner assembly is provided below with reference to FIGS. 3 and 4 of the disclosure. The conditioner assembly 124 may crimp the crop after it is cut by the mowing mechanism. Moreover, the conditioner assembly 124 may include a shielding element that deflects or redirects the crimped crop to form it into a uniform windrow. This can improve the dry down time of the crop.

Figure 2:
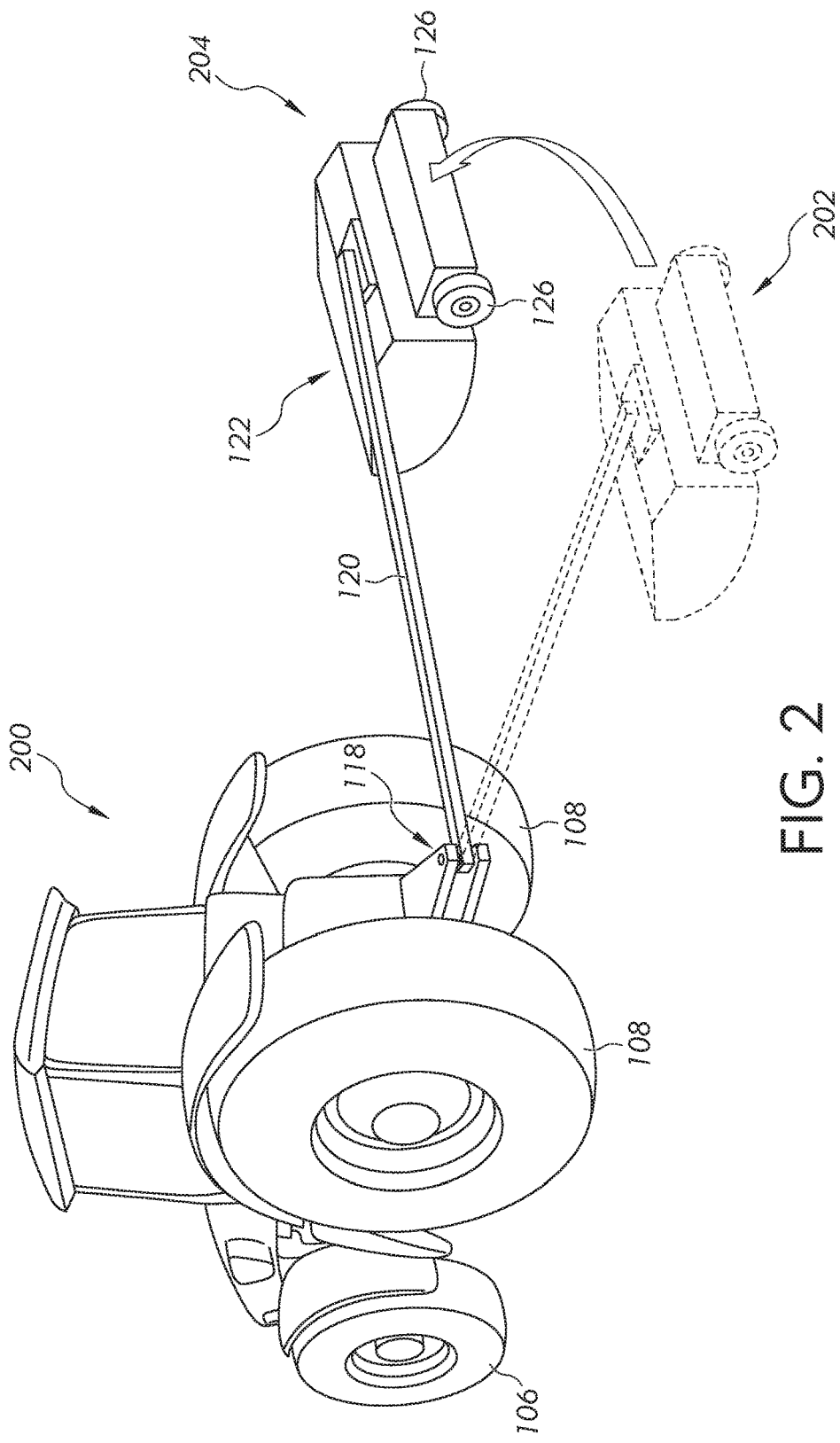
FIG. 2 is a side perspective view of another combined tractor and mower-conditioner assembly.

Referring to FIG. 2, a different embodiment of a combined tractor and mower assembly is shown. As shown, a tractor 200 may pull the mower-conditioner assembly 122 such that the assembly 122 may be disposed in a first position 202 directly behind the tractor 200, or in a second position 204 at which the mower condition assembly 122 is offset to one side of the tractor 200. In FIG. 2, and in particular in the second position 204, the mower-conditioner assembly 122 is shown offset to a right side of the tractor 200. In other embodiments, however, the assembly 122 may be offset to the left side thereof. In this manner, the rear mount hitch 118 may allow the mower-conditioner assembly 122 to be pivotably mounted thereto.

Figure 3:
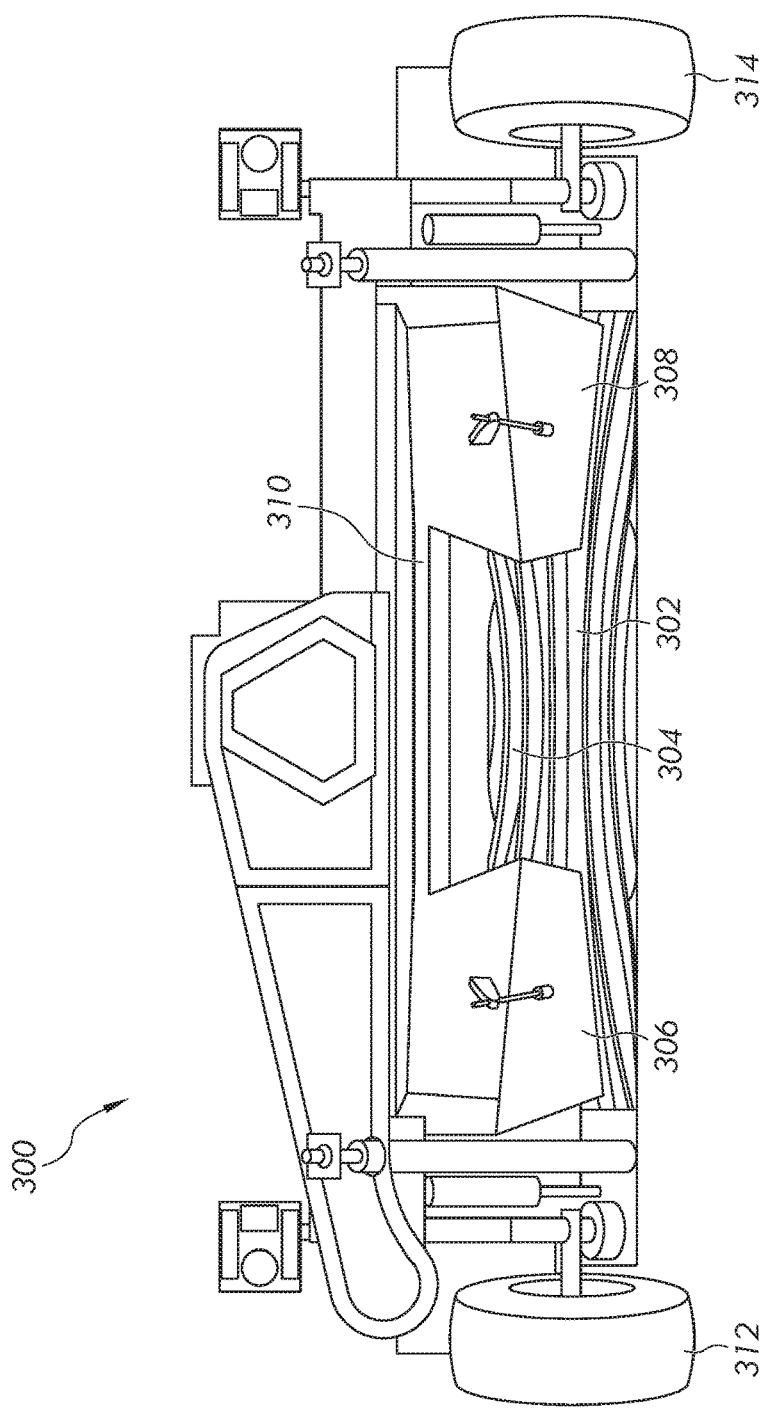
FIG. 3 is a rear view of a mower-conditioner assembly.

As described above, a conditioner assembly is provided to improve the dry down time of the crop. In FIG. 3, one embodiment of a conventional conditioner assembly is illustrated. Here, the conditioner assembly 300 may include a first roll 302 and a second roll 304. A gap or space may be defined between the two rolls such that crop that is cut by the mowing mechanism passes through the gap and between the two rolls. The rolls may be formed of a urethane material, or in other embodiments the rolls may be formed of steel. Other materials may be possible, and this disclosure is not limited to any particular material. The rolls may be rotatably driven at a high rotational velocity.

The conditioner assembly 300 may include a first wheel 312 and a second wheel 314 for travelling along the ground. During operation, the cut crop may be passed rearward and directed in a desired direction by a shield. In FIG. 3, a first shield 306 and a second shield 308 are shown. Each shield may function as a deflector to adjust or narrow a width of the crop exiting the conditioner assembly 300. The first shield 306 and the second shield 308 may be coupled to a conditioner frame 310, and in some instances, the two shields may be adjustably pivoted with respect to the frame 310 to adjust the width of the windrow. The shields may be internal to the conditioner 300, and in some embodiments, there may be one or more shields. A turn screw or the like may be provided to angularly adjust the shields. In another embodiment, the shields may be fixedly coupled to the frame 310 so that the shields are not adjustable.

Figure 4:
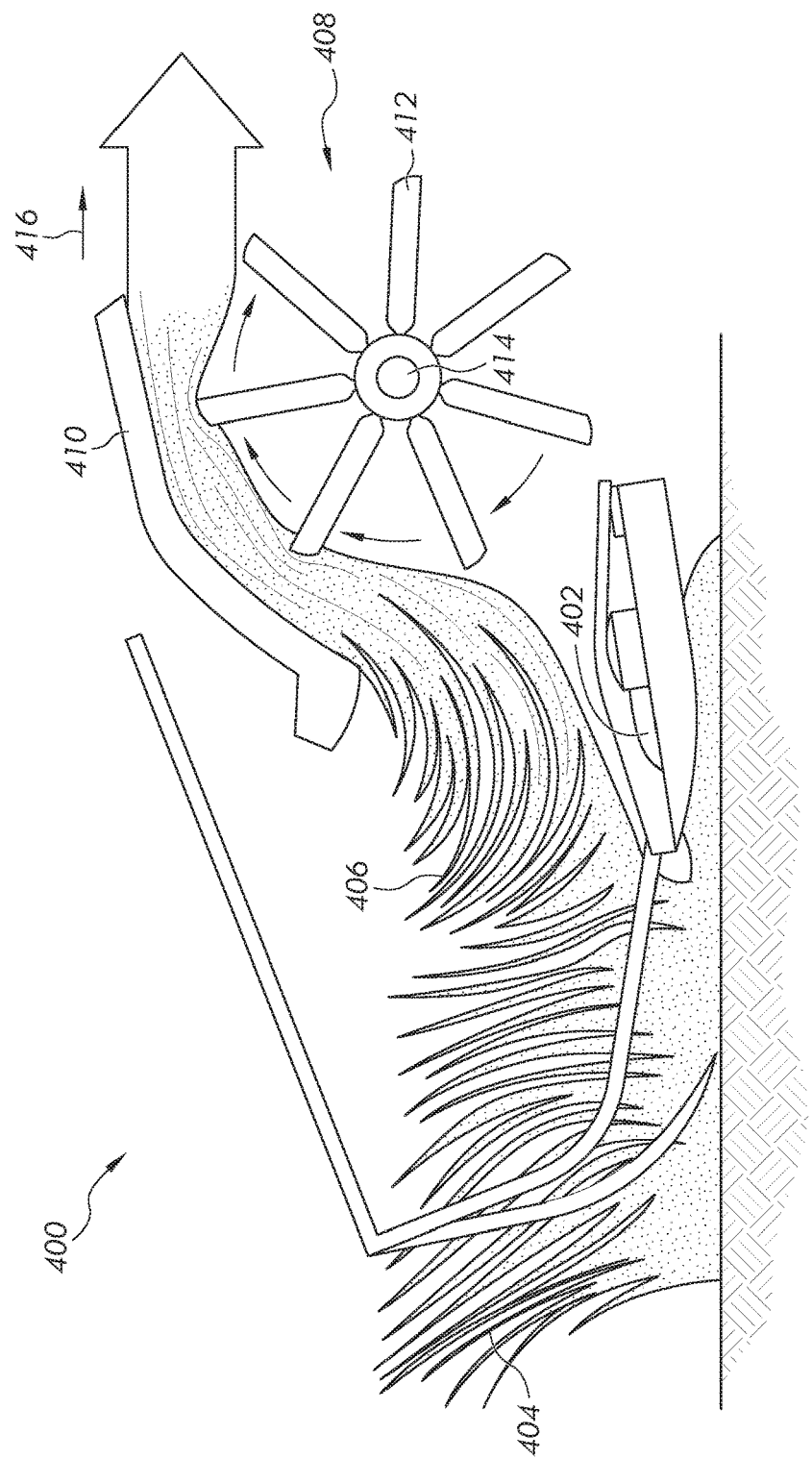
FIG. 4 is a side view schematic of an alternative mower-conditioner assembly.

In a further illustrated embodiment of FIG. 4, a second type of conditioner 400 is shown. Here, the conditioner 400 is formed by an impeller 408 having a rotation axis 414 and a plurality of tines 412. As shown, uncut crop 404 may be cut at a location near the ground by a cutter bar assembly 402. The cutter bar assembly 402 may include one or more discs with knives for cutting the crop. Once the cutter bar assembly 402 cuts the crop, the cut crop 406 passes in a rearward direction 416 toward the impeller 408. The impeller 408 may rotate about its rotation axis 414 in a clockwise direction to further move the cut crop 406 from the cutter bar assembly 402 into contact with a conditioner hood 410. As the crop 406 passes through, it may rub against or otherwise contact the conditioner hood 410 and other crop. In doing so, portions of the crop's waxy surface may be removed to further improve the dry down time.

The shields may be used to narrow the width of the crop so that during a subsequent pass, the tractor wheels do not run over the crop and damage it. This is a concern when the mower-conditioner assembly is disposed offset from the tractor, such that the mower is cutting new crop and the tractor is passing over crop that has already been cut and conditioned. Since the tractor wheels can pack the windrow into the ground and thus negatively affect the dry down time or damage the crop, it is desirable to keep the width of the windrow at least narrower than the distance between the two innermost wheels of the tractor. In doing so, the tractor can straddle the windrow as it passes over the cut crop. While this avoids packing the windrow into the ground or damaging the crop, it also tends to leave the windrow narrow and thus less moisture can escape from the windrow. It is therefore desirable to spread the windrow out as wide as possible so that the sun, wind, and surrounding environment can accelerate the dry down time.

In order to achieve a wider windrow, but one that is straddled by the tractor after it is cut, a crop moving mechanism may be provided. The crop moving mechanism may be a tedder assembly or other device that can spread the crop to a width that is substantially equivalent to the overall width of the tractor. By spreading the crop to a greater width, an optimal dry down time can be achieved. To do so, the crop moving mechanism can be mounted to either the tractor or the mower-conditioner assembly. With the crop moving mechanism located rearward of the tractor, the tractor wheels can still straddle the windrow as it passes over the cut crop, but the crop moving mechanism can then spread the crop to improve the dry down time. The crop moving mechanism or tedder assembly may include a plurality of brushes, a powered wheel with tines, or wheel rake, basket rake, or other known type of crop moving mechanism. The crop moving mechanism can pick up and fling the crop in one or more directions to spread or distribute it over a defined width. An example of this is shown in FIG. 5.

Figure 5:
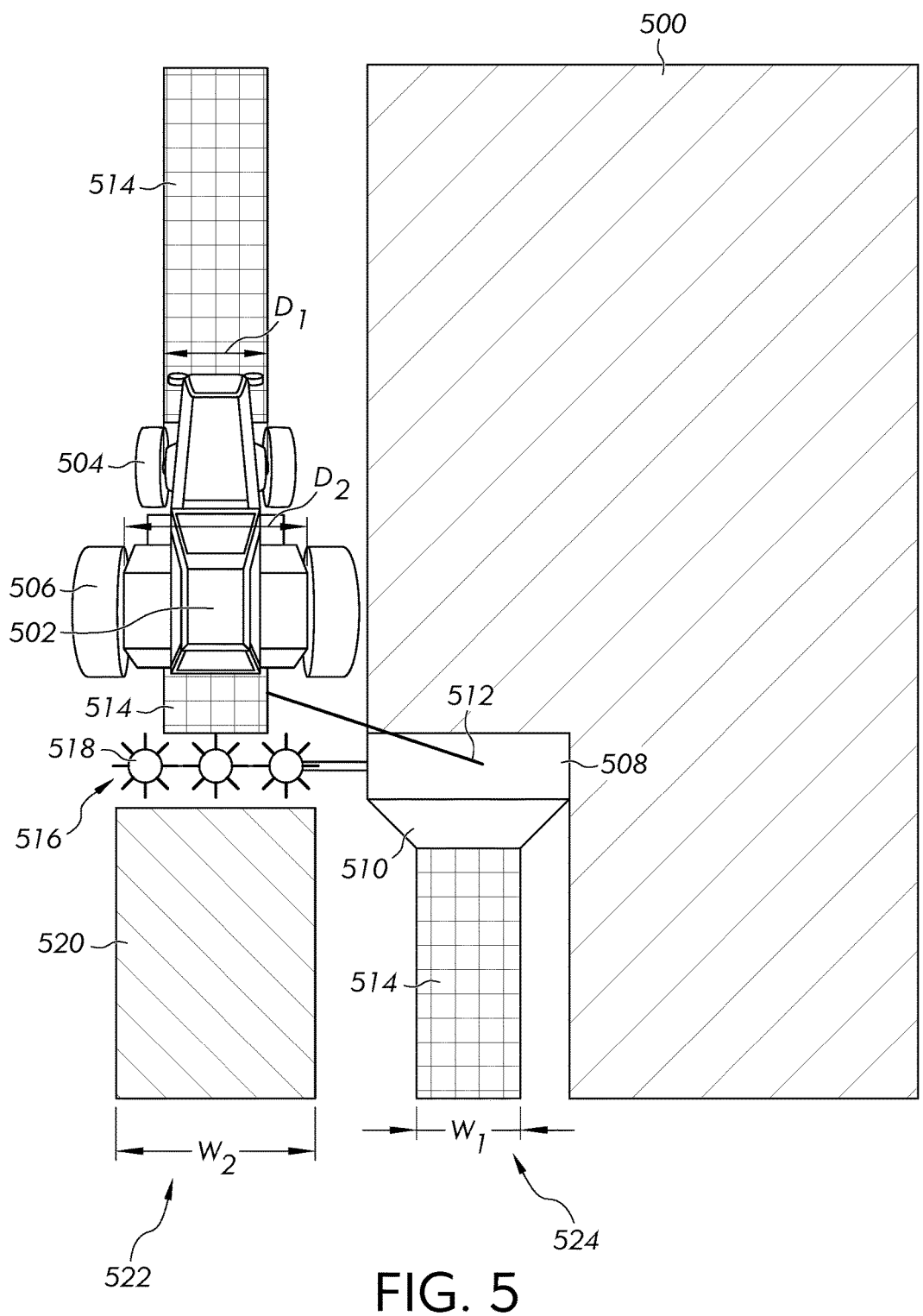
FIG. 5 is a schematic of a combined tractor and mower-conditioner assembly with a crop spreading mechanism.

In FIG. 5, a field is provided with uncut crop 500. The field may be of any size or shape, and the crop 500 may be any type of plant. In this embodiment, a tractor 502 is depicted as including a frame or chassis supported by a pair of front wheels 504 and a pair of rear wheels 506. The pair of front wheels 504 may be spaced apart by a first distance, $D_1$, and the pair of rear wheels 506 may be spaced apart by a second distance, $D_2$.

A mower-conditioner assembly may be pulled by the tractor 502 via a tongue 512 or other device, similar to that shown in FIGS. 1 and 2. The mower-conditioner assembly may include a mowing element 508 and a conditioner assembly 510. The conditioner assembly 510 may include a pair of rolls as shown in FIG. 3, an impeller as shown in FIG. 4, or any other known type of conditioner. The conditioner 510 may include a shield for redirecting cut crop into a windrow 514, as shown in FIG. 5. The windrow 514 may have a width, $W_1$, which is narrower than the smaller of the first distance, $D_1$, and second distance, $D_2$. This is also shown in FIG. 5.

Here, the mower-conditioner assembly is positioned offset to the right of the tractor 502. Thus, during operation, the mower-conditioner assembly may be pulled by the tractor 502 in a forward direction such that the mowing element 508 cuts the crop 500. The crop may be cut by a cutter bar with knives, for example, and the cut crop may pass through the conditioner 510 where it is crimped. Shielding may be used to redirect the crop to form a narrow windrow 514. As shown, the mower-conditioner assembly may first travel along a first pass area 522 of crop. After the first pass area 522 of crop is cut and crimped, the mower-conditioner assembly may travel along a second pass area 524 of crop. As it does, the tractor travels offset from the mower-conditioner assembly along the first pass area 522 of now-cut crop. In doing so, the windrow 514 is narrow enough that the tractor 502 wheels can straddle and avoid running over the crop.

In FIG. 5, as the tractor 502 straddles the windrow 514, a crop moving assembly 516 can engage and spread the crop in either or both directions to leave a substantially evenly distributed crop 520 over a second width, $W_2$. The second width, $W_2$, is greater than the first width, $W_1$, and may be approximately equal to the greater of the first distance, $D_1$, or second distance, $D_2$. In one embodiment, the second width will be greater than both the first distance and second distance. For instance, the second width may be greater than the width of the tractor 502 and wheels. In a further embodiment, the second width may be equal to or greater than the first and second distance, up to a width of the cut. The width of the crop moving assembly 516 may be wider than the overall or greatest width of the tractor 502, and thus the width of the cut is wider than the first and second distances.

The crop moving assembly 516 may include a tedder or other crop moving element 518 that moves the crop. In one example, the crop may be completely picked up off the ground and distributed equally over the second width, $W_2$. The crop moving element 518 may include a brush or brushes, a fan, a paddle, a powered wheel with tines, a wheel rake, or other crop spreading device. In effect, this can provide a maximum width swath while reducing or avoiding the opportunity for the tractor wheel to run over the crop. With the crop spread out over a much larger area, the dry down time can be reduced.

In a further embodiment, the first windrow may be formed narrower by means other than the aforementioned shielding. For example, there may be shielding or deflecting mechanisms, along with crop moving mechanisms, positioned in front or forward of the conditioner. Moreover, a second conditioner without shielding that forms a narrower windrow may also be possible. Further, rake wheels or something other than shielding disposed behind or rearward of the conditioner to form a narrow windrow. In other words, shielding is not the only mechanism that may be used to form a narrow windrow, and this disclosure is not intended to be limited to any particular mechanism located either in front or behind the conditioner for forming a narrow windrow.

While the previous embodiments illustrate the mower-conditioner assembly being offset to the right of the tractor, in other embodiments the mower-conditioner assembly may be disposed offset to either side of the tractor. In another embodiment, such as a self-propelled windrower, there may be a cutter bar and conditioner mounted to the front of the tractor. In this embodiment, the cutter bar and conditioner can cut and crimp the crop, and a shield may narrowly form the windrow so that the machine wheels avoid running over the crop. A crop moving assembly may be coupled to the rear of the windrower similar to that shown in FIG. 5 such that the windrow may be spread out once the wheels have passed by the narrowly formed windrow. The crop moving assembly may be a wheel, basket or fan.

In a further embodiment, a disc mower may be utilized as the mowing mechanism. In this embodiment, a conventional disc mower may be disposed to one side of the tractor (e.g., the right side) and a void may be left next to standing or uncut crop for the tractor wheel to travel. A combination of the disc mower and shielding may be used to cut the crop and narrow its width so the tractor can straddle the cut crop. A powered brush or other crop spreader may be utilized to spread the crop in one direction after the tractor passes over the windrow. In one example, the windrow may be formed most closely to a left edge thereof so that the crop may be spread in one direction by the crop spreader.

The crop spreader may include a brush, a wheel rake, a powered wheel with a brush or fan, a basket rake, or any other type of device that can spread the windrow after the tractor passes over it. In one example, the crop spreader may be driven mechanically, electrically, hydraulically, or a combination thereof. For example, a hydraulic or electric motor may operably drive the crop spreader.

The crop spreader may also be designed such that it does not engage or contact the ground, but rather only moves a top portion of the windrow as it passes by. The lower portion of the windrow may remain in place, but with the overall width of the windrow increased and the crop spread more evenly, the dry down time may be reduced to improve overall efficiency.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A tractor assembly, comprising:
a tractor including a first set of wheels and a second set of wheels;
a mower-conditioner assembly pivotally coupled to the tractor to be positioned on either a right side or left side of the tractor, the mower-conditioner assembly including a mowing mechanism configured to cut a crop and a conditioner configured to crimp the crop;
a first shield coupled to the conditioner at a location rearward thereof and biased towards a first side, a second shield coupled the conditioner at a location rearward thereof and biased towards a second side, the first and second shield configured to deflect the crimped crop rearwardly therefrom and form a windrow of a first width; and
a crop moving assembly coupled to either the tractor or mower-conditioner assembly, the crop moving assembly being disposed directly behind the tractor;
wherein, the crop moving assembly includes a device for spreading the windrow in at least one direction to form a second width;
wherein, the second width is greater than the first width.

2. The tractor assembly of claim 1, wherein the first width is less than a first distance defined between the first set of wheels and a second distance defined between the second set of wheels.

3. The tractor assembly of claim 2, wherein the second width is greater than or equal to the first distance or second distance.

4. The tractor assembly of claim 1, wherein the crop moving assembly comprises an electrically powered brush.

5. The tractor assembly of claim 1, wherein the crop moving assembly comprises a fan, a wheel rake, a basket rake, or a combination thereof.

6. The tractor assembly of claim 1, wherein the crop moving assembly moves only a top portion of the windrow as it passes over the windrow.

7. A tractor assembly, comprising:
a tractor including a first set of wheels and a second set of wheels, the first set of wheels spaced apart by a first distance and the second set of wheels spaced apart by a second distance;
a disc mower assembly pivotally coupled to the tractor to be positioned on either a left side or a right side of the tractor, the disc mower assembly including a cutting mechanism configured to cut a crop;
a first shield and a second shield coupled to the disc mower at a location rearward thereof, the first shield biased towards a first side of the disc mower and the second shield biased towards a second side of the disc mower, the first and second shield configured to deflect the crop rearwardly therefrom and form a windrow having a first width; and
a crop moving assembly coupled to the tractor or disc mower at a location rearward of the tractor;
wherein, the crop moving assembly includes a device for spreading the windrow in one direction to form a second width;
wherein, the second width is greater than the first width.

8. The tractor assembly of claim 7, wherein the first width is less than the first distance and the second distance.

9. The tractor assembly of claim 7, wherein the second width is greater than or equal to the first distance or second distance.

10. The tractor assembly of claim 7, wherein the crop moving assembly comprises an electrically powered brush.

11. The tractor assembly of claim 7, wherein the crop moving assembly comprises a fan, a wheel rake, a basket rake, or a combination thereof.

12. A method of forming a swath of crop for improved dry down time, comprising:
providing a tractor including a first set of wheels and a second set of wheels, a mower-conditioner assembly pivotally coupled to the tractor and configured to be positioned on a left side or a right side of the tractor, a first and second shield coupled to the mower-conditioner assembly on opposing sides thereof, and a crop moving assembly coupled to either the tractor or mower-conditioner assembly;
operably pulling the mower-conditioner assembly and crop moving assembly in a forward direction of travel during a first pass to cut the crop;
cutting the crop with a mowing mechanism of the mower-conditioner assembly;
crimping the crop with a conditioner of the mower-conditioner assembly;
forming a narrow windrow of the crop by adjusting a first and second turn screw of the first and second shield, the narrow windrow having a first width;
straddling the narrow windrow with the first and second set of wheels during a second pass; and
spreading the windrow in at least one direction with the crop moving assembly after the straddling step.

13. The method of claim 12, further comprising spreading the windrow in the at least one direction so that the windrow comprises a width that is greater than the first width.

14. The tractor assembly of claim 1, further wherein the first shield and the second shield are rake wheels.

* * * * *